United States Patent [19]
Stemple

[11] 3,774,311
[45] Nov. 27, 1973

[54] CARRIAGE AND BEARING ARRANGEMENT FOR A MEASURING MACHINE

[75] Inventor: James M. Stemple, Springfield, Ohio

[73] Assignee: The Bendix Corporation, Southfield, Mich.

[22] Filed: Mar. 1, 1971

[21] Appl. No.: 119,781

[52] U.S. Cl. ............... 33/174 R, 33/1 M, 105/150, 104/243
[51] Int. Cl. ............................................. G01b 3/00
[58] Field of Search............ 33/1 M, 174 TA, 174 R; 212/18; 172/229; 177/190, 191; 308/3.8; 105/29, 30, 150

[56] References Cited
UNITED STATES PATENTS
3,403,448  10/1968  Aller ................................. 33/174 L
3,354,550  11/1967  Leschinger .......................... 33/79 R

*Primary Examiner*—Robert B. Hull
*Assistant Examiner*—Richard R. Stearns
*Attorney*—John R. Benefiel and Plante, Hartz, Smith & Thompson

[57] ABSTRACT

A measuring machine of the type having a probe supported by carriages for precision movement along the "X," "Y," and "Z" axes which features improved "spool" bearings for the carriages and probe to minimize way machining costs, and/or the number of bearing adjustments and their total number and also featuring an improved X-axis carriage geometry and bearing support arrangement to minimize overall machine size and deflections caused by traversing of the probe in the "Y" plane.

6 Claims, 10 Drawing Figures

Patented Nov. 27, 1973

INVENTOR
JAMES M. STEMPLE
BY
John R Benefiel
ATTORNEY

Patented Nov. 27, 1973

INVENTOR
JAMES M. STEMPLE

BY John R. Benefiel
ATTORNEY

FIG. 4

INVENTOR
JAMES M. STEMPLE
BY John R Benefiel
ATTORNEY

Patented Nov. 27, 1973

INVENTOR
JAMES M. STEMPLE

BY
John R. Benefiel
ATTORNEY

PRIOR ART

INVENTOR
JAMES M. STEMPLE

3,774,311

CARRIAGE AND BEARING ARRANGEMENT FOR A MEASURING MACHINE

BACKGROUND OF THE INVENTION

1. Field of the Invention

This invention concerns measuring machines and more particularly measuring machines having a probe supported by carriages for precision movement along the "X," "Y," and "Z" axes.

2. Description of the Prior Art

Prior art devices of this type often employ numerous precision ball bearings since the carriages must be supported against both vertical and lateral loads at several points. Since these bearings support movement along the precision ground ways, they must be carefully adjusted with respect to each other and the ways, and as they must be individually of precision construction, these bearings are relatively expensive. Thus, a substantial portion of the costs of fabricating these machines is found in the carriage bearing and way structure. Prior art attempts to provide two plane supports from a single bearing to minimize these costs involved the use of expensive V-groove ways, which are expensive to machine to the necessary degree of precision.

In addition, these machines often utilize a vertical stabilizing post, connected to the X-axis carriage supporting the probe and Y-axis carriage. The X-axis carriage is supported by sets of bearings running at right angles to each other on a round or rectangular way, while the post end runs on a vertical surface parallel to the X-axis way to stabilize the X-axis carriage against deflections occurring from the overhang of the Y-axis boom and to prevent mechanical amplification of way surface inaccuracies to the probe location. As will hereinafter be explained in further detail, this arrangement has led to excessive varying movements of the probe along the Y-axis as a result of the structural deflections caused by the shifting weight of the X-axis carriage as it traverses for measurements. In addition, the post itself creates a large vertical dimension in the machine, greatly contributing to the overall bulk thereof.

Hence, it is an object of the present invention to provide a bearing arrangement for a measuring machine which reduces the number of precision bearings and adjustments without involving relatively expensive way or probe construction.

It is a further object to provide an improved geometry and bearing support for the X-axis carriage and stabilizing member of such measuring machines to minimize error due to deflection of these posts and reduce significantly the vertical dimension thereof.

SUMMARY OF THE INVENTION

These and other objects which will become apparent upon a reading of the following specification and claims is accomplished by utilizing "spool" bearings which run on external cylindrical or partially cylindrical surfaces to thus provide two plane support at a minimum way cost, lowering the number of bearings and bearing adjustments required.

The X-axis and stabilizing member geometry and bearing support arrangement include the use of spool bearings to support the X-axis carriage, and a horizontal stabilizing spar member configuration which both contribute to minimize Y-axis movement of the probe as a result of structural deflections and also render the machine more compact.

DETAILED DESCRIPTION

In the following detailed description certain specific terminology will be utilized for the sake of clarity and specific embodiments will be described in order to provide a complete understanding of the invention, but it is to be understood that the invention is not so limited and may be practiced in a variety of forms and embodiments.

Figure 1:
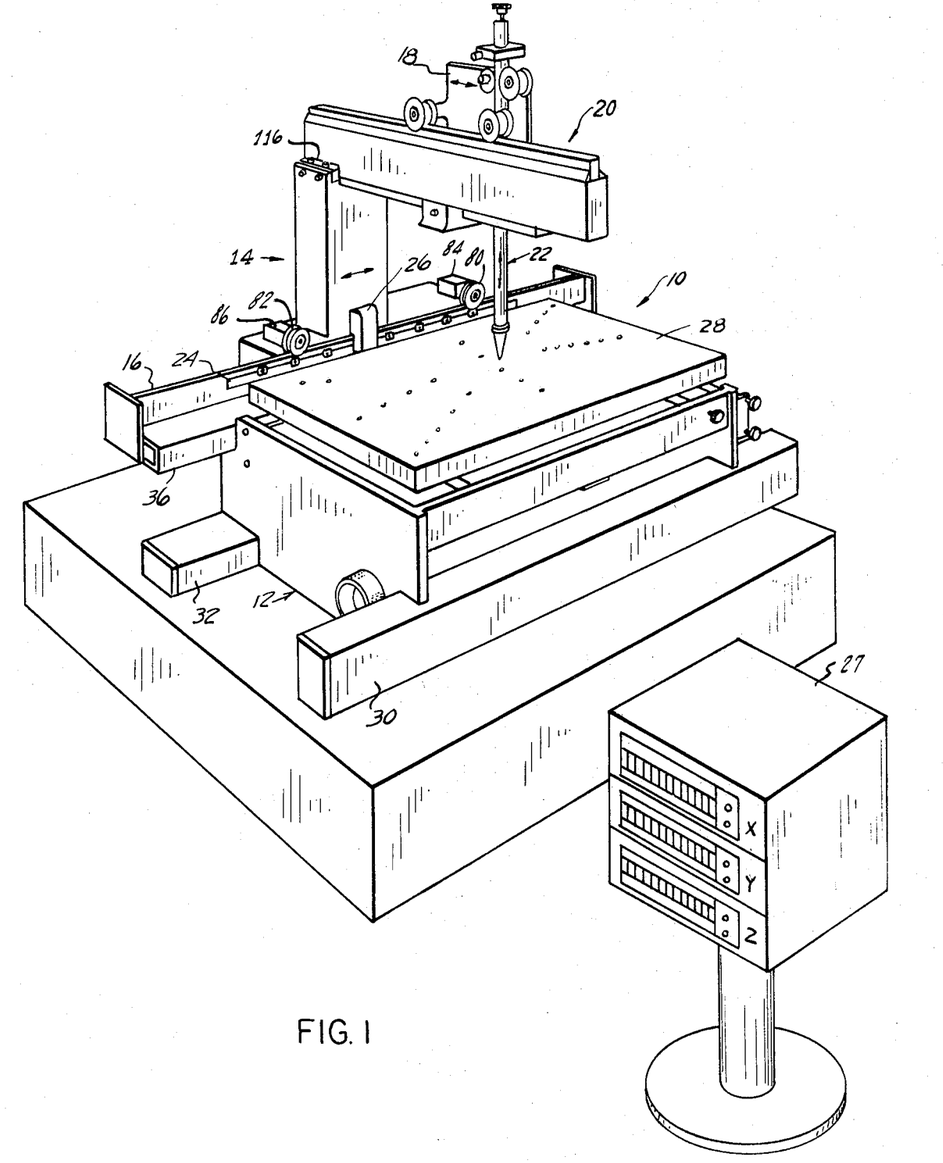
FIG. 1 is a perspective view of a measuring machine according to the present invention, without covers and other mechanical detail to better illustrate the bearing, way, and other structural aspects of the machine.

Referring to the drawings, and particularly FIG. 1, the measuring machine 10 is depicted. This machine is comprised of a base portion 12, an X-axis carriage 14, supported for rolling movement on way 16, a Y-axis carriage 18, supported for rolling movement on way 20, and a probe 22 supported for free vertical movement with respect to the Y-axis carriage 18.

This machine is equipped with means for indicating movement of the carriage along the X and Y axes, and optionally, for up and down movement of the probe 22. This means may take the form of the electro-optical system described in detail in U.S. Pat. No. 2,886,717, which would entail the use of a grating as at 24 mounted to the side of way 16, and an associated reading head 26 affixed to the movable X-axis carriage 14. Movement of the X-axis carriage 14 produces signals indicative of position to a readout device 27. Thus a part mounted on the table 28 may be measured by use of the probe 22 moving it to the positions of the portions of the part part to be located.

Since this system is not a part of the invention per se and is well known in the art, it is not felt necessary to describe the same in any greater detail.

Figure 2:
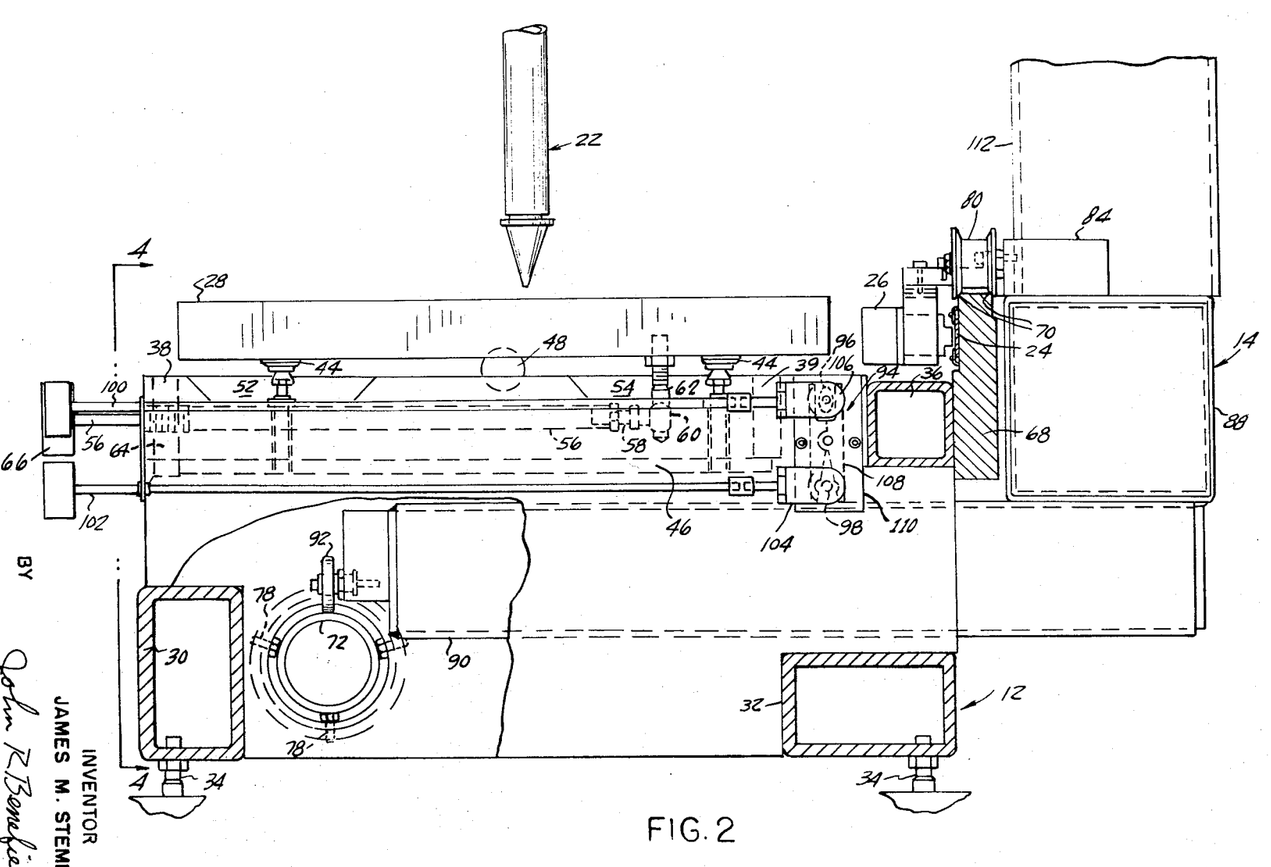
FIG. 2 is a side elevation in partial section of the lower portion of the measuring machine illustrated in FIG. 1.
Figure 4:
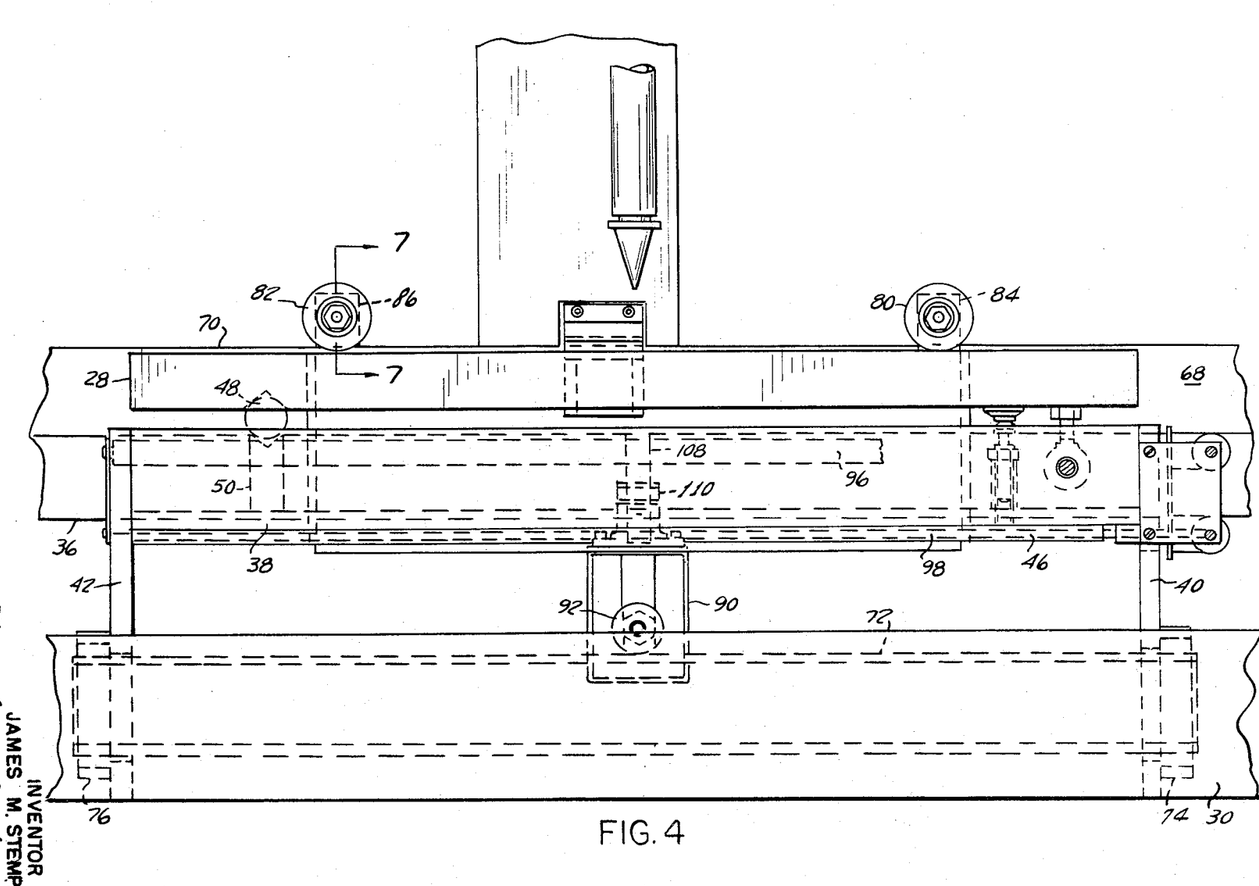
FIG. 4 is a front elevation of the lower portion of the measuring machine illustrated in FIG. 1.

Referring to FIGS. 2 and 4, the lower portion of the measuring machine is shown in detail.

The base 12 includes a pair of lower box beams 30 and 32 extending across the bottom of the base 12, and which support the machine on a table or other surface by means of a plurality of leveling devices 34. The base 12 also includes an upper box beam 36, which together with crosspieces 38, 39, and side plates 40 and 42 welded thereto and to both lower box beams 30 and 32, form a box frame.

The table 28 is supported on the base 12 by means of a pair of adjustable bearing pad assemblies 44 supported on a floor plate 46, which is welded to the side plates 40 and 42 and crosspieces 38 and 39 as well as by a spherical bearing 48 supported on crosspiece 50 and forming both a vertical and horizontal pivot point for adjustment of the table 28 in these planes.

To level the table, the bearing pad assemblies 44 may be adjusted for height through openings 52 and 54.

After fastening the part to be measured to the table 28, it may be necessary to adjust the table in the horizontal plane to align the part axis with the machine axis. For this purpose an adjusting rod 56 is provided connected to the stud 58 integral with a self-aligning bearing 60, in turn carried by housing 62 bolted to the underside of the table 28. The adjusting rod 56 threadedly engages crosspiece 38 at 64 so that upon rotation of knob 66 the table is rotated in the horizontal plane about the spherical bearing 48.

Welded to the upper box beam 36 is a way beam 68, having way surfaces 70 ground thereon, to be described infra in greater particularity, as well as the grating strip 24.

The base portion 12 also includes a precision ground tube 72, mounted by the side plates 40 and 42 by means of flanges 74 and 76 and adjusting bolts 78 so that the tube 72 may be aligned with the way surfaces 70.

The X-axis carriage is mounted for rolling movement on the way surfaces 70 means of a pair of "spool" bearings 80 and 82 to be described in more detail infra carried by a pair of housings 84 and 86 fixed to box beam 88.

Welded to the box beam 88 is a stabilizing spar 90, extending into the space under the floor plate 46, and guided by means of a bearing 92 at its opposite end, rolling along the precision ground tube 72 so as to control tilting movement of the X-axis carriage 14 as will be described infra in greater particularity.

In order to lock the X-axis carriage 14 against movement along the way 70, and in order to provide fine adjustment of its movement, a traversing and locking mechanism 94 is provided, which is the subject of copending U.S. Pat. application Ser. No. 303,674 - filed Nov. 2, 1972, attorney's Docket No. AUM 71-3(b) entitled, "Lock and Fine Feed Traverse Mechanism and Bearing Arrangement for a Measuring Machine Carriage," and is described therein in greater detail. This mechanism includes a brake bar 96 and a threaded adjusting bar 98 rotatably mounted in the side plates 40 and 42 and which may be rotated by extension rods 100 and 102 and right angle drives 104 and 106, respectively. A gripper linkage 108 is pivotally mounted on a bracket 110 fixed to the stabilizer spar 90. Rotation of the extension rod 102 will cause a fine adjustment travel of the X-axis carriage against the frictional engagement of the brake bar 96 and the gripper linkage 108.

Figure 3:
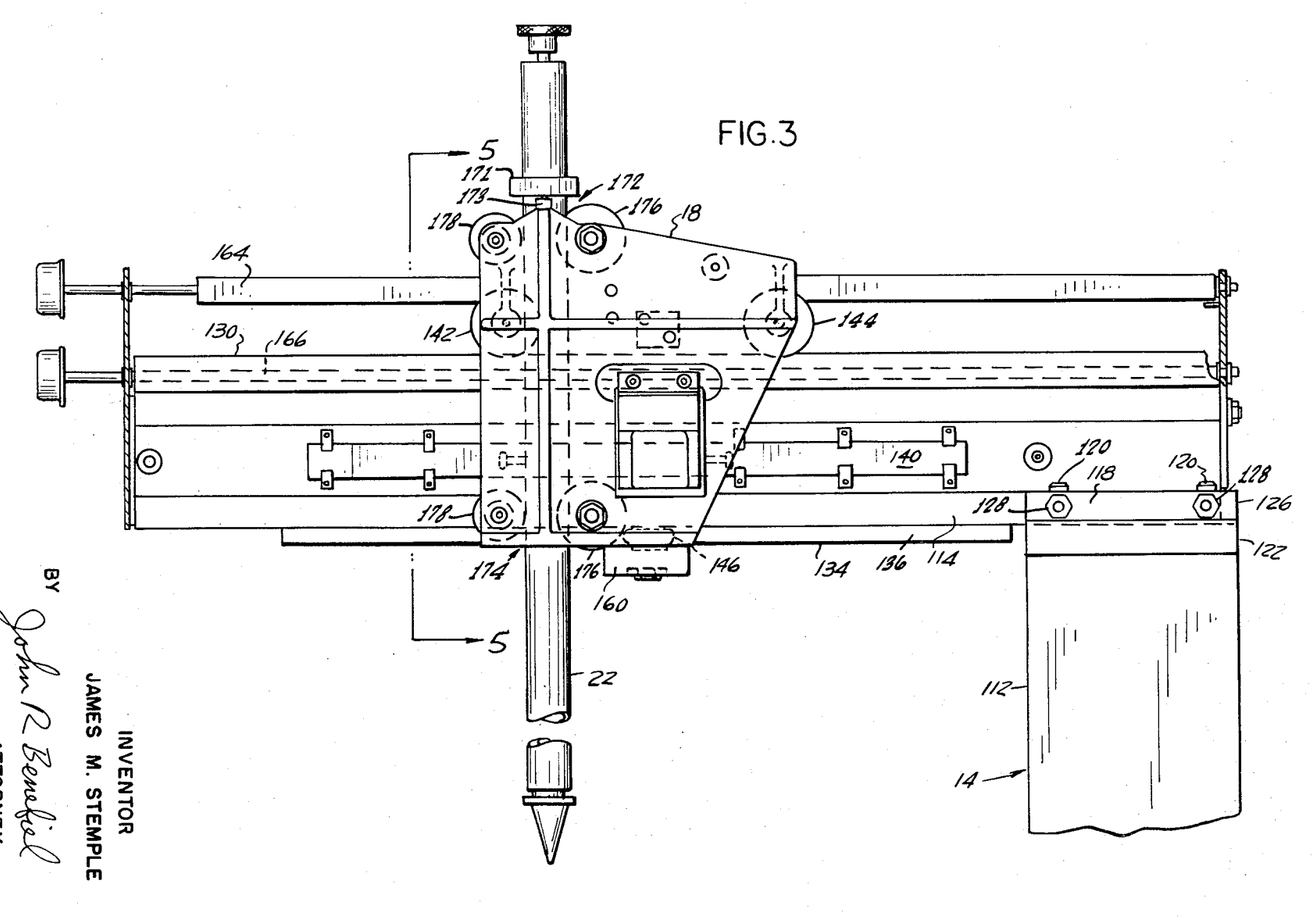
FIG. 3 is a side elevation in partial section of the upper portion of the measuring machine illustrated in FIG. 1.
Figure 5:
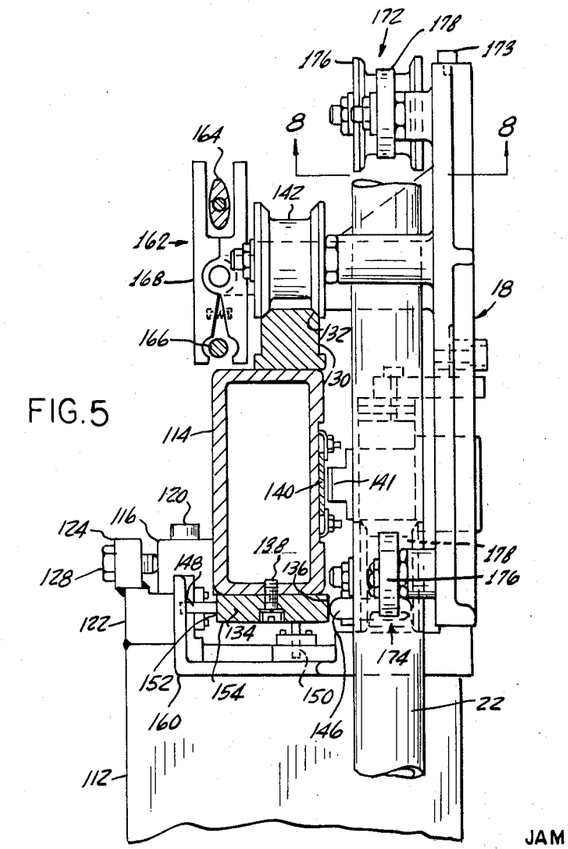
FIG. 5 is a view of the section taken along the line 5—5 in FIG. 3.

Referring to FIGS. 3 and 5, the upper portion of the measuring machine 10 is shown in greater detail.

This includes a vertical post beam 112 fixed to the box beam 88 (FIG. 2). A horizontally extending boom member 114 is clamped thereto between blocks 116 and 118, which in turn are secured by means of cap screws 120 to the post beam end cap 122. In order to align the boom member 114 at right angles to the X-axis way surfaces, blocks 124 and 126 are provided with adjusting clamping bolts 128.

Welded to the upper surface of the boom member 114 is an upper way 130 having way surfaces 132 ground thereon.

Positioned at the lower edge of the boom member 114, is a lower way 134 having a vertically disposed way surface 136 ground thereon. The lower way 134 is adjustably secured to the boom member by cap screws 138, so that the y-axis carriage will run at right angles thereto througout its length of travel.

Also fixed to the boom member 114 is the Y-axis grating 140, while a reading head 141 is carried by the carriage 18.

The Y-axis carriage 18 is supported on the boom member 114 by a pair of spool type roller bearings 142 and 144 rotatably mounted to the Y-axis carriage 18 and engaging the upper way surfaces 132, as well as a horizontally disposed spherical bearing 146 also rotatably supported by the Y-axis carriage 18.

In order to insure that all three bearings 142, 144, and 146 remain firmly in contact with upper and lower ways 130 and 134, a pair of spring loaded rollers 148 and 150 engaging surfaces 152 and 154, respectively of the lower way 134 are provided.

Figure 6:
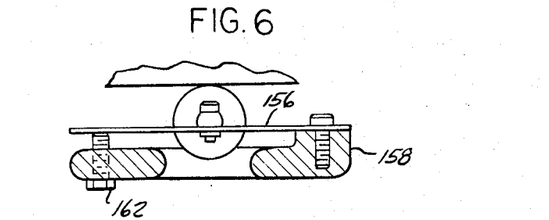
FIG. 6 is a view of the section taken along the line 6—6 in FIG. 5.

As shown in detail in FIG. 6, each of these rollers is rotatably supported on a spring leaf 156 fastened to a mounting bracket 158 each in turn supported on bracket 160 secured to the Y-axis carriage 18.

Adjusting screw 162 is used to create sufficient pressure of the rollers on the surfaces 152 and 154 to insure firm engagement of the bearings 142, 144, and 146 during measuring operations.

A more detailed explanation of the advantages of this way and bearing arrangement are found in the above-identified copending application.

A Y-axis carriage traversing and locking mechanism 162 is also incorporated similar to that for the X-axis carriage 14, including a brake bar 164, a threaded adjustment rod 166, and a gripper linkage 168 pinned to block 170 fixed to the Y-axis carriage 18.

Rotation of brake bar 164 and adjusting rod 166 causes frictional locking and adjustment respectively of the Y-axis carriage in the same manner as the X-axis traversing and locking mechanism 94.

Figure 8:
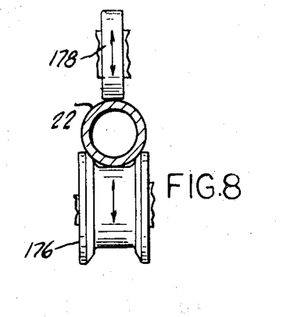
FIG. 8 is a view of the section taken along the line 8—8 in FIG. 5.

The probe 22 which may be constructed according to U.S. Pat. No. 3,403,488 is supported for vertical travel by two sets of opposed bearings 172 and 174 rotatably mounted to the Y-axis carriage 18. Each set is comprised of a spool bearing 176 and a conventional roller 178 to thereby provide guidance in all directions for the probe 22. As depicted in FIG. 8, this arrangement simplifies the adjustments to be made in aligning the travel of the probe 22 as only a total of four bearings are involved, without involving costly V-groove ways. An adjustable stop is provided by collar 171 and cap screw 173.

Figure 7:
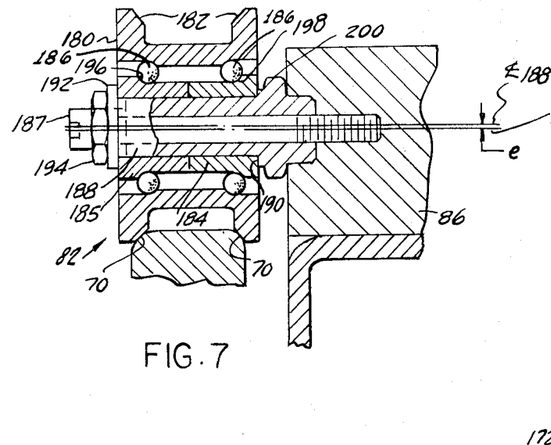
FIG. 7 is a view of the section taken along the line 7—7 in FIG. 4.

Referring to FIG. 7, the spool bearing 82, which is representative of all the spool bearings described, is shown in section. This bearing includes outer race 180 which has a pair of inwardly sloping surfaces 182 that bear on the complementarily ground outwardly directed concave way surfaces 70. This configuration provides guidance in both lateral and vertical directions without requiring expensive internal V-grooves as used with other two-plane ball bearings. The bearing also includes a split sleeve inner race comprised of sleeves 184 and 185 with two sets of balls 186 disposed between the oppositely disposed surfaces of the two races.

This bearing includes an arrangement for "preloading" the balls to eliminate any radial or axial play as well as an adjustment mechanism for shifting the center of rotation of the bearing for alignment purposes.

The preload arrangement includes a hub member 188 having one end fitted into a bore in the block 86 and retained therein by means of a cap screw 187, and having an abutment 190 with one end of the sleeve half 185. Fitted over the other end of the hub member 188 is a washer 192 while a pre-load nut 194 is also threaded thereonto, to thus be capable of creating an axial pressure on the sleeve halves 184, 185 forcing them towards each other. This causes camming of the balls 186 up the inner curved surfaces 196 and 198 until firmly engaged with the outer race 180 to thus eliminate axial and radial play in the bearing and insure proper runout between the inner and outer race. In this regard, the axial dimension of the sleeves 184 and 185, the diameter of the races and balls are selected so that the correct preload is obtained, i.e., all the play is eliminated without excessive loading of the balls, upon seating of the sleeve halves 184 and 185 upon each other.

The adjustment arrangement consists of an eccentric relationship between the centerline of the cap screw 187 and the hub member 188. By loosening cap screw 187, the rotating hub member 188 relative thereto by means of a hex surface 200 formed on the hub member, the position of the centerline of rotation of the bearing may be adjusted so that the applicable part will be properly located and traverse properly with respect to the rest of the machine.

Thus it can be seen that this bearing configuration yields two-directional guidance without requiring internal V-grooves and running on relatively inexpensive external curved surfaces such as round shafts or rounded way surfaces such as 70. This allows a fewer number of bearings to be used and thus lessens the difficulties in alignment adjustments and the total cost of the machine.

Figure 9:
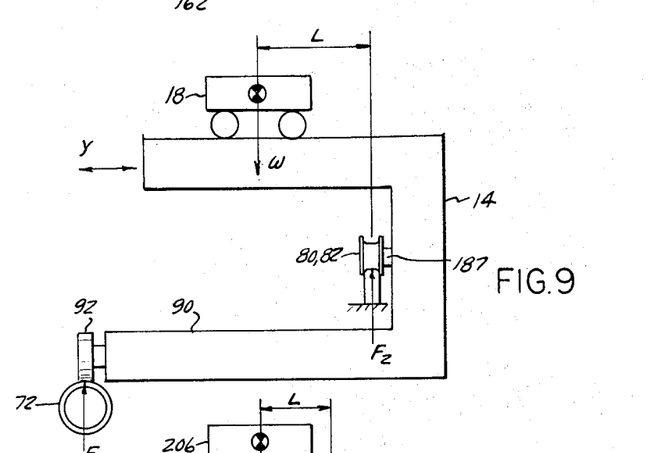
FIG. 9 is a diagrammatic representation of the bearing arrangement and stabilizer member geometry illustrating the force distribution occurring as a result of the Y-axis carriage weight.
Figure 10:
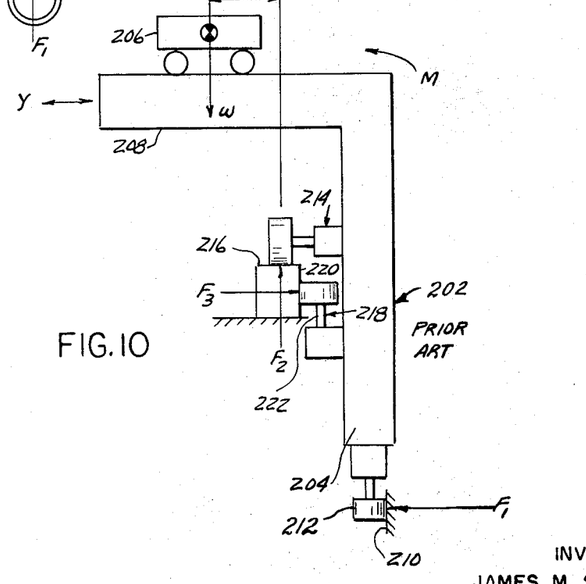
FIG. 10 is a diagrammatic representation of the bearing arrangement and stabilizing post geometry of the prior art illustrating the force distribution occurring as a result of the Y-axis carriage weight.

With the aid of FIGS. 9 and 10, the advantage of this type of bearing used in conjunction with the X-axis carriage 14 as well as the advan-tages accruing from geometry of the X-axis carriage may be explained.

As noted above, this type of machine has in the past usually incorporated a stabilizer post, represented in FIG. 10 as the lower portion 204 of beam 202, in order to resist the movement exerted by the Y-axis carriage weight represented by the body 206 without excessive deflections of parts or mechanical amplification of X-axis way inaccuracies. Hence, the lower portion 204 was extended down and arranged to run on lower guide way 210 by means of roller 212 so that the beam 204 and the probe was positioned by means of the guide way 210 so that geometric inaccuracies were not amplified at the probe due to the length of the lower portion while a relatively low reaction force $F_1$ was available to handle the turning moment created by the X-axis carriage weight.

The weight of the carriage W is carried by a pair of rollers 214 on upper way 216 producing reaction $F_2$.

However, it has been found that this arrangement has resulted in significant and varying error movement of the probe in the Y-axis direction as the probe is traversed in the same direction.

It is felt that this error is due to two effects: It can be shown that the presence of the reaction force $F_1$ creates the need for an oppositely directed force in order to insure the sum of the horizontal or $F_1$ forces is equal to zero. Since the roller 214 is not capable of resisting this reaction, a second roller 218 running on way 220 which is usually employed to provide guidance in the X-Y plane is thus also required to supply a reaction force $F_3$.

Stated another way, due to the presence of the reaction point of $F_1$, the carriage 206 creates a moment M about that point which cannot be resisted by roller 214, hence the necessity for the roller 218.

Moreover, since the roller 218 has been mounted at right angles to the force $F_3$, its shaft 222 is subjected to bending, resulting in excessive deflections thereof which vary with the moment exerted by the traversing carriage. This results in substantial Y-axis error movement of the probe as the entire X-axis carriage and boom tends to pitch in the direction of the Y-axis.

This problem is substantially nullified by the bearing arrangement and geometry shown in FIG. 9. In this arrangement, which represents in diagrammatic form the arrangement disclosed infra, the stabilizer spar extends transversely to the X-axis carriage 14, at substantially right angles thereto, with the roller 92 running on the right angles track 72 as described. Thus, the reaction $F_1$ between the roller 92 and the tube 72 acts along a vertically extending line of action. This eliminates the transverse force unbalance described above, since the vertical force is merely added into and absorbed by the vertical force balance existing at upper way bearings 80 and 82. Stated the other way, the moment created about the tube 72 by the carriage weight W may be balanced by the vertically directed reaction force $F_2$ at the upper way bearing.

Moreover, any lateral guidance forces exerted on the bearing shafts 80 and 82 result in tension-compression loading of the bearing shafts 187 rather than bending due to the two-plane configuration and thus deflections thereof are much lessened for a given load than when loaded in bending. This results in much reduced Y-axis error movement as a result of traversing of the carriage 18.

Of course varying moments and bending of the support shafts bearings 80 and 82 tending to produce Z-axis movement still remain, but this is of much less concern in a primarily two-axis machine as disclosed.

While a specific embodiment has been described, the invention is not to be so limited and many variations are of course possible within the scope of the present invention. In this regard, it is noted that the stabilizer spar has been described as associated with the X-axis carriage, but what is referred to as X and Y is only dependent on their orientation with respect to the machine, whereas the stabilizer spar is used to advantage on whichever carriage that supports the other carriage, which in turn supports the probe regardless of its designation as to "X" or "Y."

What is claimed is:

1. In a measuring machine of the type having "X axis" and "Y axis" carriages with one movably supported on the other and a probe carried by said one carriage the improvement comprising:
   first bearing means supporting said other carriage for guided movement along one of said X or Y axes;
   a boom member fixed to said other carriage extending horizontally therefrom and along the other of said X or Y axes for guiding said one carriage for movement;
   a stabilizer member fixed to said other carriage and extending horizontally therefrom in the same direction as said boom member; and
   second bearing means guiding said stabilizer member for movement along the one of said axes.

2. The measuring machine of claim 1 wherein said second bearing means includes means guiding said stabilizer member against tipping movement induced in said other carriage by traversing of said one carriage.

3. The measuring machine of claim 1 wherein said first bearing means includes means providing translational constraint in directions transverse to the direction of said first bearing means of said other carriage.

4. The measuring machine of claim 3 wherein said means providing constraint provides constraint in both vertical and horizontal directions.

5. The measuring machine of claim 4 wherein said first bearing means includes at least one bearing supported on said other carriage for rotation on a horizontally extending axis and having a pair of contact surfaces extending circumferentially from said bearing at axially spaced points and sloping inwardly from the outer periphery thereof and further includes a way member having a pair of surfaces each engaging one of said contact surfaces to guide said one bearing along said one of said X or Y axes.

6. The measuring machine of claim 5 wherein said pair of contact surfaces on said way member includes opposed convexly curved surfaces.

* * * * *